United States Patent [19]

Karrer

[11] 4,309,546

[45] Jan. 5, 1982

[54] PIPERIDINO PYRROLIDINONES

[75] Inventor: Friedrich Karrer, Zofingen, Switzerland

[73] Assignee: Ciba-Geigy Corporation, Ardsley, N.Y.

[21] Appl. No.: 143,387

[22] Filed: Apr. 24, 1980

[30] Foreign Application Priority Data

Apr. 27, 1979 [CH] Switzerland .................. 3991/79

[51] Int. Cl.$^3$ ................. C07D 401/04; C07D 401/14; C07D 401/12
[52] U.S. Cl. ..................................... 546/187; 546/208; 546/5; 546/19; 546/210; 542/437; 544/221; 544/222; 260/458 NP; 260/458 NH
[58] Field of Search ................. 546/187, 208; 542/437

[56] References Cited

U.S. PATENT DOCUMENTS 2,993,021 7/1961 Bavley et al. ................... 260/30.2
3,904,581 9/1975 Murayama et al. ............ 260/45.8 N
4,138,243 2/1979 Bohner et al. ..................... 71/94

FOREIGN PATENT DOCUMENTS 1578821 11/1980 United Kingdom .

Primary Examiner—Robert T. Bond
Attorney, Agent, or Firm—Harry Falber

[57] ABSTRACT

Pyrrolidiones of the formula I

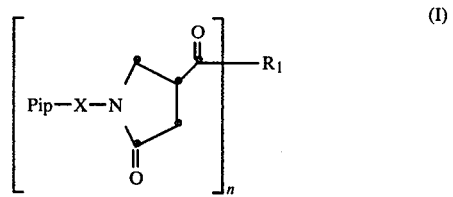

wherein n is 1, 2, 3 or 4, $R_1$ is free or esterified hydroxyl or hydroxyl which has been converted to a salt or is substituted or unsubstituted amino, X is a direct bond or a linking member and Pip is a substituted or unsubstituted 2,2,6,6-tetraalkylpiperidin-4-yl or a 2,2,6,6-tetraalkylpiperidin-4-ylidene, which pyrrolidones can be oligomerized or polymerized by linking $R_1$ with X or by linking $R_1$ with Pip. These compounds are used as light stabilizers for polymers.

9 Claims, No Drawings

PIPERIDINO PYRROLIDINONES

The invention relates to novel pyrrolidones, processes for their manufacture, their use as stabilisers, and organic material stabilised against light-induced and thermal degradation with the aid of these pyrrolidones.

Pyrrolidones are known compounds, for example those disclosed in U.S. Pat. No. 2,993,021, according to which two pyrrolidone radicals are bonded through the nitrogen atoms by alkylene, oxalkylene or azalkylene; these pyrrolidones are used as plasticisers for PVC, as monomers for addition polymers and for the preparation of alkyl resins. Pyrrolidones with a polyoxyalkylene chain at the nitrogen atom are known from German Offenlegungsschrift No. 2 721 626 and are used as curing agents or as curing accelerators for epoxy resins and polyurethane foams.

It has now been found that pyrrolidones which have a 2,2,6,6-tetraalkylpiperidine radical at the nitrogen atom are valuable stabilisers for polymers and, in addition to having an outstanding light stabilising action, cause no discolouration of the substrate, are stable to heat and are difficult to extract from the substrate.

Accordingly, the invention provides pyrrolidones of the formula I

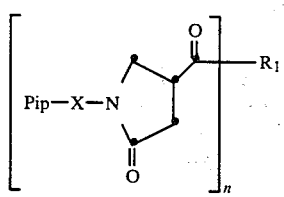

wherein n is 1, 2, 3 or 4, $R_1$ is free or esterified hydroxyl or hydroxyl which has been converted to a salt, or is substituted or unsubstituted amino, X is a direct bond or a linking member and Pip is a substituted or unsubstituted 2,2,6,6-tetraalkylpiperidin-4-yl or a 2,2,6,6-tetraalkylpiperidin-4-ylidene, which pyrrolidones can be oligomerised or polymerised by linking $R_1$ with X or with Pip, and salts thereof.

Eligible salts are those with inorganic or organic acids, as well as complex salts, such as those with nickel compounds. Compounds which are capable of salt formation are those containing a basic nitrogen atom. Examples of suitable acids are hydrochloric, sulfuric or phosphoric acid, or acetic acid, formic acid, salicylic acid, toluenesulfonic acid, diethylphosphoric acid, phenylphosphoric acid, diphenylphosphonic acid, 4-dodecylbenzenesulfonic acid or maleic acid monoester.

Esterified hydroxyl $R_1$ and substituted amino $R_1$ contain, in particular, 1 to 40 carbon atoms and a linking member X contains, in particular, 2 to 20 carbon atoms.

The pyrrolidones of the formula I comprise not only monomers but also oligomers and polymers.

The monomer pyrrolidones of the formula I have, in particular, the formula II

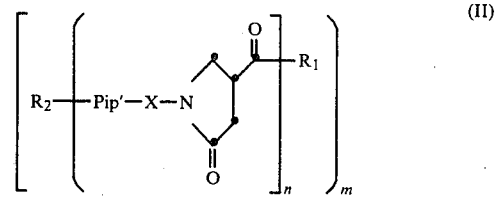

wherein n, $R_1$ and X are as defined above, PiP' corresponds to the above radical Pip, m is 1 or 2 and $R_2$ is a monovalent or divalent radical linked to the Pip-nitrogen atom, while $R_2$ is a monovalent radical if n is 2, 3 or 4.

The oligomer and polymer pyrrolidones of the formula I have, in particular, the formula III or IV

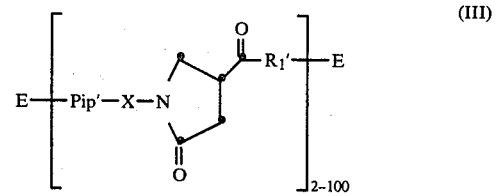

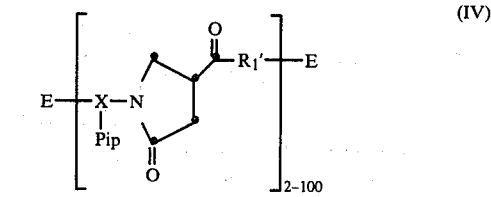

wherein X and Pip are as defined above, Pip' corresponds to the radical Pip, $R_1'$ corresponds to the radical $R_1$ and the Es are end groups.

If n is 1 in formula I or II, $R_1$ is: hydroxyl, in which case the pyrrolidones can also be in the form of betaines, hydroxyl which has been converted into a salt, especially hydroxyl which has been converted into a salt with one equivalent of Ca, Mg, Al, Zn, Co or Ni, $C_{1-20}$ alkoxy, $C_{3-20}$ oxaalkoxy, $C_{3-20}$ alkenyloxy, $C_{3-6}$ alkynyloxy, $C_{5-7}$ cycloalkoxy, $C_{6-18}$ aryloxy, such as phenoxy or naphthoxy, ($C_{1-8}$ alkyl)-phenoxy, halogenophenoxy, hydroxyphenoxy or ($C_{1-8}$ alkyl)-hydroxyphenoxy or also $C_{7-16}$ aralkoxy, such as benzyloxy, which can substituted in the phenyl nucleus by $C_{1-8}$ alkyl, halogen and/or hydroxyl, or also 2-hydroxyethoxy, which can carry methyl in the 2-position and moreover can carry alkyl, phenyl or phenoxymethyl in the 2-position, or also amino, $C_{1-20}$ alkylamino, $C_{3-14}$ alkenylamino, di-$C_{1-20}$-alkylamino, di-$C_{3-14}$-alkenylamino, $C_{5-7}$ cycloalkylamino, di-$C_{5-7}$-cycloalkylamino, $C_{6-18}$ arylamino, such as phenylamino, ($C_{1-8}$ alkylphenyl)amino, (halophenyl)amino, (hydroxyphenyl)amino or ($C_{1-8}$ alkylhydroxyphenyl)amino, while the amino group can also carry $C_{1-8}$ alkyl as further N-substituents.

When n is 1, $R_1$ can also be a radical of the formula IVa

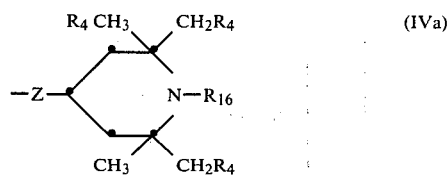

wherein $R_4$ and $R_{16}$ have the general and preferred meanings given hereinafter, and Z is O, NH or $NR_z$, in which $R_z$ is $C_{1-12}$ alkyl, especially $C_{1-4}$ alkyl, such as methyl, in which case Z is O or preferably NH.

If n is 2 in formula I or II, $R_1$ is: $-O-R_3-O-$, in which $R_3$ is $C_{2-20}$ alkylene, $C_{4-8}$ alkenylene, $C_4$ alkynylene, $C_{5-6}$ cycloalkylene, $C_{6-10}$ arylene or $C_{7-16}$ aralkylene, or also V

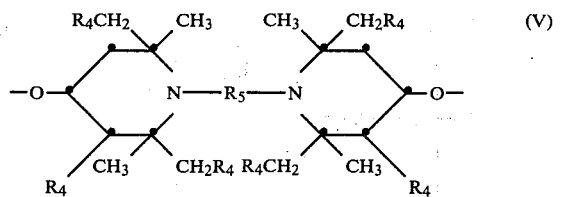

in which $R_4$ is hydrogen or methyl and $R_5$ is 2-butenylene or p-phenylenedimethylene, or also $-N(R_6)-R_7-N(R_6)-$, in which $R_6$ is hydrogen, $C_{1-6}$ alkyl, $C_{3-5}$ alkenyl, $C_{5-6}$ cycloalkyl, phenyl, $C_{7-12}$ aralkyl or 2,2,6,6-tetramethylpiperidin-4-yl with hydrogen, methyl or benzyl at the piperidine nitrogen atom and $R_7$ is $C_{2-12}$ alkylene, $C_{3-12}$ oxalkylene, $C_{3-12}$ azalkylene, $C_{6-12}$ arylene, $C_{8-15}$ aralkylene or $C_{5-6}$ cycloalkylene, or also $-O-CH_2-C(OH)(R_8)-R_9-C(OH)(R_8)CH_2-O-$,
in which $R_8$ is hydrogen or methyl, or in which the radicals $R_8$ together with the radical to which they are linked can form a 5- or 6-membered cycloalkyl ring; and in which $R_9$ is a direct bond, $C_{1-6}$ alkylene or $C_{3-6}$ oxalkylene or in which $R_9$ is VI or VII

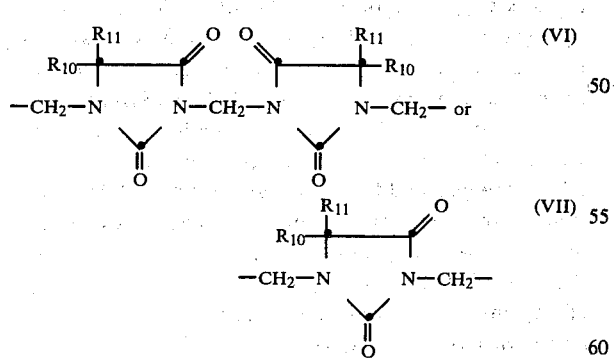

and $R_{10}$ and $R_{11}$ are hydrogen or $C_{1-4}$ alkyl, or $R_{10}$ and $R_{11}$ together are tetramethylene or pentamethylene.

If n is 3 in formula I or II, $R_1$ is a trioxy radical of a $C_{3-20}$ alkanetriol in which one carbon atom is attached to not more than one oxygen atom, or also a radical VIII

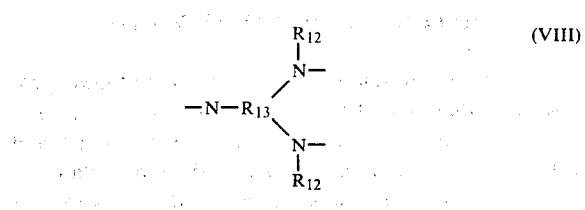

in which $R_{12}$ is hydrogen, $C_{1-4}$ alkyl, $C_{3-5}$ alkenyl, phenyl or benzyl, and in which $R_{13}$ is a trivalent radical of $C_{3-20}$ alkyl, $C_{6-12}$ aryl or $C_{7-16}$ aralkyl, or also a radical IX

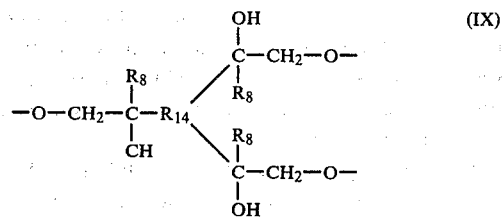

in which $R_8$ is hydrogen or methyl or two radicals $R_8$ together with the radical to which they are linked form a 5- or 6-membered cycloalkyl ring, and in which $R_{14}$ is a trivalent radical of $C_{3-18}$ alkyl, or $R_{14}$ is X

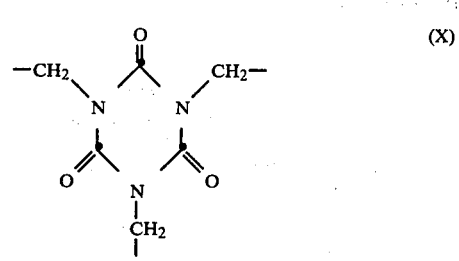

or $R_{14}$ is XI

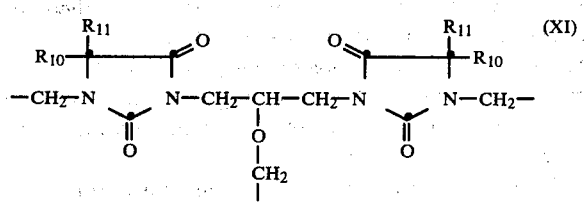

in which $R_{10}$ and $R_{11}$ are hydrogen or $C_{1-4}$ alkyl, or $R_{10}$ and $R_{11}$ together are tetramethylene or pentamethylene.

If n is 4 in formula I or II, $R_1$ is: a tetroxy radical of a $C_{4-20}$ alkanetetraol in which one carbon atom is attached to not more than one oxygen atom, or also a radical XII

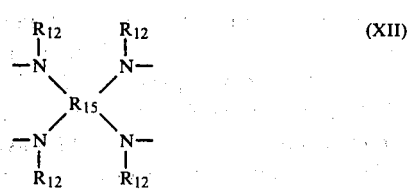

in which $R_{12}$ is hydrogen, $C_{1-4}$ alkyl, $C_{3-5}$ alkenyl, phenyl or benzyl and $R_{15}$ is a tetravalent radical of $C_{3-20}$ alkyl, $C_{6-12}$ aryl or $C_{7-16}$ aralkyl.

In formula I, the radical Pip together with X is in particular a radical XIII, XIV or XV

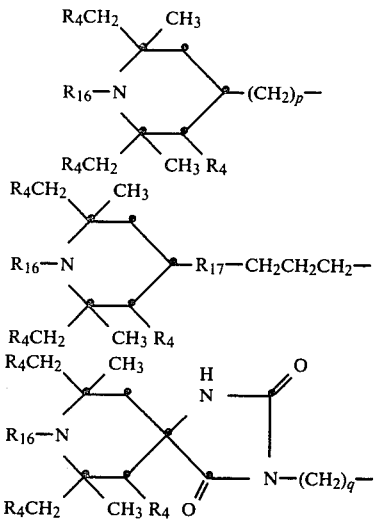

in which $R_4$ is hydrogen or methyl, $R_{16}$ is hydrogen, $C_{1-16}$ alkyl, $C_{3-8}$ alkenyl, propargyl, $C_{7-16}$ aralkyl, $C_{1-4}$ alkanoyl, $C_{3-5}$ alkenoyl, $C_{3-6}$ β-hydroxyalkyl, $C_{8-12}$ β-hydroxyaralkyl, ($C_{1-4}$ alkoxycarbonyl) methyl, oxyl or 2-hydroxy-3-phenoxypropyl, p is 0 or 2, $R_{17}$ is oxygen or $NR_{18}$, $R_{18}$ is hydrogen, methyl, benzyl, allyl or $C_{2-5}$ alkanoyl and q is 2, 3, 4 or 5.

In formula II, if m is 1 the radical Pip' together with X and $R_2$ is one of the above radicals XIII, XIV, XV.

In formula II, if m is 2 the radical Pip' together with X and $R_2$ is in particular a radical XVI, XVII, XVIII, XIX or XX

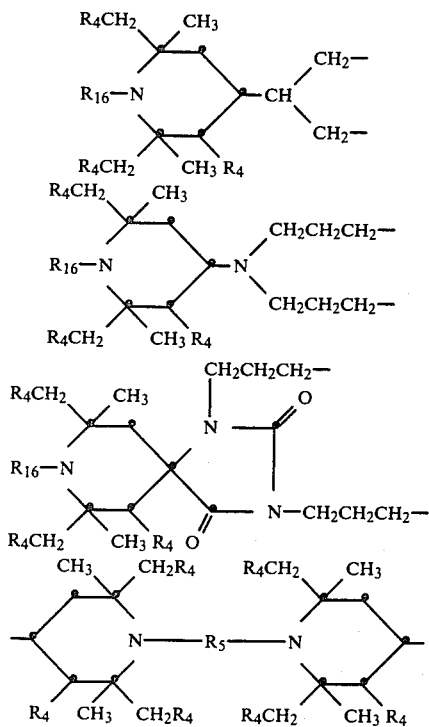

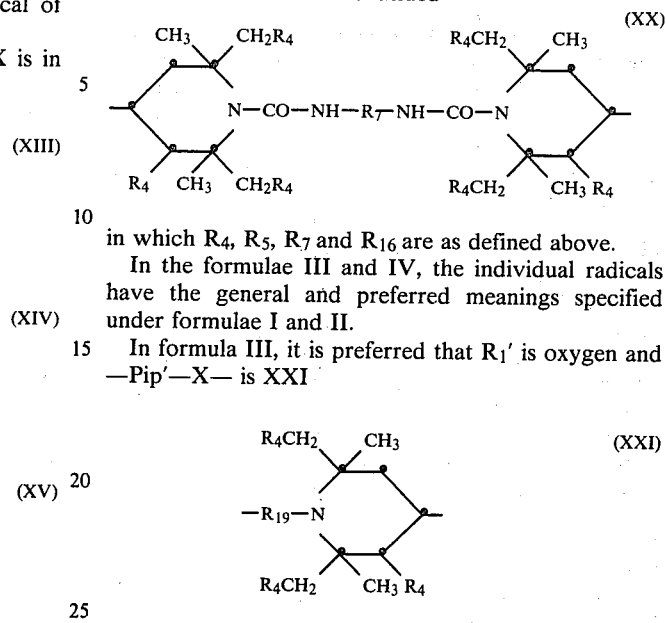

in which $R_4$, $R_5$, $R_7$ and $R_{16}$ are as defined above.

In the formulae III and IV, the individual radicals have the general and preferred meanings specified under formulae I and II.

In formula III, it is preferred that $R_1'$ is oxygen and —Pip'—X— is XXI

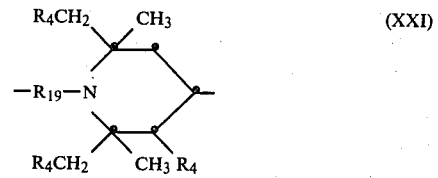

wherein $R_4$ is as defined above and $R_{19}$ is ethylene, 2-methylethylene, 2-ethylethylene, 2-phenylethylene, 2-(phenoxymethyl)-ethylene, 2-butenylene or p-phenylenediamine, or $R_1'$ has the meaning assigned to $R_1$ when n is 2 in formula I or II and —Pip'—X— is a radical XIX, XX or XXII

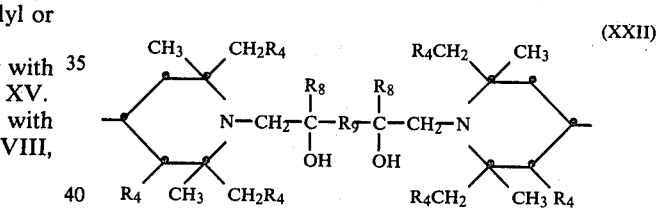

in which $R_4$, $R_5$, $R_7$, $R_8$ and $R_9$ are as defined above and E is hydrogen or $C_{1-6}$ alkoxy.

Preferably, in formula IV, $R_1'$ is oxygen and —X(-Pip)— is a $C_{3-6}$ alkylene radical to which a radical XIII is linked, in which $R_4$, p and $R_{16}$ are as defined above, such as 1,3-propylene to which a radical XIII, in which p is 0, is linked in the 2-position, while E is hydrogen or $C_{1-6}$ alkoxy.

Preferred compounds of the formula II are those in which n is 1 or 2 and, if n is 1, $R_1$ is hydroxyl, hydroxyl which has been converted into a salt, $C_{1-12}$ alkoxy, amino, $C_{1-12}$ alkylamino or di-$C_{1-12}$-alkylamino, or, if n is 2, $R_1$ is $C_{2-8}$ alkylenedioxy or $C_{2-8}$ alkylenediamino, m is 1 and $R_2$—Pip'—X— is a radical XIII in which p is 0, $R_4$ is hydrogen and $R_{16}$ is hydrogen, $C_{1-8}$ alkyl, benzyl, $C_{1-4}$ alkanoyl or $C_{2-6}$ β-hydroxyalkyl.

Especially preferred compounds of the formula II are those in which n is 1, $R_1$ is hydroxyl, hydroxyl which has been converted into a salt, $C_{1-6}$ alkoxy, amino, $C_{1-6}$ alkylamino or di-$C_{1-6}$-alkylamino, m is 1 and $R_1$—Pip'—X— is a radical XIII in which p is 0, $R_4$ is hydrogen and $R_{16}$ is hydrogen, methyl or benzyl, Preferred compounds of the formula III are those in which $R_1'$ is oxygen and —Pip'—X— is a radical XXI in which $R_4$ is hydrogen and $R_{19}$ is ethylene, 2-methylethylene, 2-ethylethylene, 2-phenylethylene, 2- butenylene or p-phenylenedimethylene and E is hydrogen or $C_{1-6}$ alkoxy.

Preferred compounds of the formula IV are those in which $R_1'$ is oxygen and —X—(Pip)— is 1,3-propylene which in the 2-position carries a radical XIII in which p is 0, $R_4$ is hydrogen and $R_{16}$ is hydrogen, methyl or benzyl, and E is hydrogen or $C_{1-6}$ alkoxy.

The compounds described in the Examples are likewise preferred.

The pyrrolidones of the present invention can be obtained by a process which proceeds in a surprisingly advantageous manner.

According to the prior art cited initially, i.e. according to U.S. Pat. No. 2,993,021, itaconic acid diesters are reacted with a diamine to produce pyrrolidones accompanied by the liberation of alcohol (cf. column 3, lines 40–70). Similarly, German Offenlegungsschrift No. 2 721 626 describes the reaction of e.g. itaconic acid with a polyoxyalkylenediamine to produce pyrrolidones under the conditions of cyclisation.

The application of this reaction to amines which carry a piperidinyl radical Pip was, however, not obvious to the skilled person, as it had to be doubted whether a 2,2,6,6-tetraalkylpiperidine would be able to withstand the requisite cyclisation conditions at all. However, it has been observed that this reaction leads to exceptionally advantageous results in the case of the pyrrolidones of the invention. This result was unexpected. The yield and the purity of the products are surprisingly good and the process is simple to carry out.

Accordingly, the invention also provides a process for the manufacture of pyrrolidones of the formula I, which process comprises reacting itaconic acid, or an ester thereof, with an amine XXIII

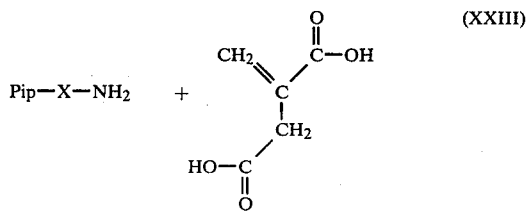

under cyclisation conditions and, if desired, in the resultant pyrrolidones of the formula I, subjecting the esterified or free hydroxyl group $R_1$ to transesterification or esterification, conversion to a salt, saponification or amidation.

The reaction can be carried out in an inert solvent, such as a hydrocarbon, for example toluene or xylene, or water; but advantageously it can also be carried out without a solvent. The temperature is preferably elevated and in the range from about 40°–200° C. and in particular from 60°–140° C. The reaction time is several hours and in particular 2–24 hours. Preferably, the reaction is carried out in an inert gas atmosphere, for example under nitrogen. Water or alcohol formed is advantageously removed from the reaction mixture and in particular is distilled off.

Thus a free hydroxyl group $R_1$ together with the carbonyl group forms a free carboxyl group, which can be converted initially e.g. into an acid chloride group COCl, for example with thionyl chloride in methanol, which group can then be converted by alcoholysis into the corresponding ester group, for example with methanol into a methoxycarbonyl group.

If desired, individual substituents in pyrrolidones thus obtained can be modified in a manner known per se; in particular, a hydroxyl group $R_1$ can be converted into a salt, for example by reaction with a metal hydroxide or metal oxide, or esterified, for example with a halide Hal-$R_1$, such as an alkyl bromide, alkenyl bromide, benzyl chloride or the like, preferably in the presence of a base, such as potassium carbonate. A NH group in the piperidinyl radical Pip can be substituted at the same time. The esterification can also be effected with an epoxide, in which case esters containing a β-hydroxyl group in the radical $R_1$ are obtained. In resultant pyrrolidones which contain an esterified hydroxyl group $R_1$, for example an alkoxy radical $R_1$, such as methoxy, this group can be transesterified to another esterified hydroxyl group $R_1$, in particular in the presence of a basic catalyst, such as an alkali metal amide, for example lithium amide, and/or an aluminium alkoxide, for example aluminium isopropoxide, and, if desired, in the presence of an inert solvent, such as a hydrocarbon, for example toluene or xylene. Alkoxy $R_1$ can, however, also be converted to amino, e.g. by reaction with ammonia or an amine, if desired in the presence of a base and at elevated temperature, while preferably distilling off the alkanol.

Hydroxyl $R_1$ can likewise be converted into amino, e.g. by reaction with an amine at elevated temperature and while distilling off the water of reaction. Chlorine $R_1$ can also be converted into amino e.g. by reaction with an amine, if desired, together with a base to bind the HCl formed. The same applies to the formation of di- or polyamines.

Resultant pyrrolidones which contain a NH group in the piperidinyl radical Pip can be substituted at this nitrogen atom, for example by oxidation with peracids and the like, to give the N-oxyls, by reaction with epoxides to give β-hydroxy derivatives, by acylation, for example with acid anhydrides or acid halides, to give acyl derivatives, by alkylation, benzylation and the like to give the N-alkyl, N-benzyl derivatives and the like, or by reaction with isocyanates to give urea derivatives. If reactants containing several functional groups are used in these reactions, corresponding pyrrolidones are obtained in which, for example, n is 2, 3 or 4 or m is 2. Thus, for example, diols, dihalides, diamines, diepoxides, diisocyanates, triols, triamines, triepoxides or tetraols can be used and pyrrolidones thus obtained can be converted into other pyrrolidones. However, it is possible in particular to employ e.g. diamines or triamines direct for the preparation of the pyrrolidones themselves, in which case pyrrolidones of the formula I containing 2 or 3 pyrrolidone radicals in the molecule are correspondingly obtained.

Oligomer or polymer pyrrolidones are obtained, in particular, by reacting a pyrrolidone containing an alkoxy radical $R_1$, for example methoxy, and a hydroxyalkyl radical as the N-substituent of the piperidinyl radical Pip, for example β-hydroxyethyl, in the presence of a basic catalyst and at elevated temperature, in particular in an inert solvent such as toluene or xylene, while preferably distilling off the alkanol, for example methanol.

However, it is also possible to react a pyrrolidone in which $R_1$ is OH, and which contains a NH group in the piperidinyl radical Pip, with a suitable divalent compound such as a dihaloalkane or p-phenylenedimethylene halide, for example the bromide or chloride, in particular in the presence of a base, for example potassium carbonate, in a solvent, such as a ketone, for example methyl ethyl ketone or cyclohexanone, and at elevated temperature, in which case it is possible to use e.g. potassium iodide as the catalyst. Likewise, pyrrolidones containing two piperidinyl radicals Pip, in which the nitrogen atom is unsubstituted, can be reacted with diisocyanates, such as p-phenylene diisocyanate or the 2-methyl derivatives thereof, in which case polyureas are obtained in conventional manner. However, pyrrolidones of the last mentioned type containing 2 radicals Pip, can also be reacted in the manner described with difunctional alkylating agents and the like, e.g. with a dihaloalkalane or p-phenylene-dimethylene halide, in particular in the presence of a base, such as potassium carbonate, and an inert solvent, e.g. methyl ethyl ketone, cyclohexanone or dimethyl formamide.

The starting materials used are known or, if some of them should be novel, they can be obtained by procedures analogous to those used for obtaining known materials. Amines of the formula XXIII have been disclosed e.g. in U.S. Pat. Nos. 3,684,765, 3,639,409, and 3,937,711, and British patent specification No. 1,492,494.

According to the present invention, the compounds of the formula I can be used as stabilisers for plastics, to protect them against damage caused by the action of oxygen, heat and light.

Light-sensitive materials are e.g. fats and oils, photographic films and papers, cosmetic bases, and especially plastics and lacquers. Polymers on which such plastics and lacquers can be based are:

1. Polymers of mono- and di-olefins, for example polyethylene (which can be crosslinked), polypropylene, polyisobutylene, polymethylbut-1-ene, polymethylpent-1-ene, polyisoprene or polybutadiene.

2. Mixtures of the polymers mentioned under (1), for example mixtures of polypropylene with polyethylene or with polyisobutylene.

3. Copolymers of mono- and di-olefins, for example ethylene/propylene copolymers, propylene/but-1-ene copolymers, propylene/isobutylene copolymers and ethylene/but-1-ene copolymers and also terpolymers of ethylene with propylene and a diene, such as hexadiene, dicyclopentadiene or ethylidenenorbornene.

4. Polystyrene.

5. Copolymers of styrene or α-methylstyrene with dienes or acrylic derivatives, for example styrene/butadiene, styrene/acrylonitrile or styrene/acrylonitrile/methyl acrylate; mixtures of high impact strength obtained from styrene copolymers and another polymer, for example a polyacrylate, a diene polymer or an ethylene/propylene/diene terpolymer; and also block copolymers of styrene, for example styrene/butadiene/styrene, styrene/isoprene/styrene or styrene/ethylene-butylene/styrene.

6. Graft copolymers or styrene, for example styrene on polybutadiene, styrene and acrylonitrile on polybutadiene and mixtures thereof with the copolymers listed under (5), such as those known as ABS polymers.

7. Halogen-containing polymers, for example polyvinyl chloride, polyvinylidene chloride, polyvinyl fluoride, polychloroprene, chlorinated rubbers and copolymers such as vinyl chloride/vinylidene chloride, vinyl chloride/vinyl acetate or vinylidene chloride/vinyl acetate.

8. Polymers which are derived from α,β-unsaturated acids and their derivatives, such as polyacrylates and polymethacrylates, polyacrylamides and polyacrylonitrile.

9. Polymers which are derived from unsaturated alcohols and amines or their acyl derivatives or acetals, such as polyvinyl alcohol; polyvinyl acetate, polyvinyl stearate, polyvinyl benzoate, polyvinyl maleate, polyvinylbutyral, polyallyl phthalate, polyallylmelamine and their copolymers with other vinyl compounds, such as ethylene/vinyl acetate copolymers.

10. Homo- and co-polymers of epoxides, such as polyethylene oxide, polypropylene oxide or their copolymers with bis-glycidyl ethers.

11. Polyacetals, such as polyoxymethylene, and also those polyoxymethylenes which contain ethylene oxide as the comonomer.

12. polyphenylene oxides,

13. Polyurethanes and polyureas.

14. Polycarbonates.

15. Polysulphones.

16. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

17. Polyesters which are derived from dicarboxylic acids and dialcohols and/or from hydroxycarboxylic acids or the corresponding lactones, such as polyethylene terephthalate, polybutylene terephthalate and poly-1,4-dimethylolcyclohexane terephthalate, and also block polyetheresters which are derived from polyethers with hydroxyl end groups and dicarboxylic acids.

18. Crosslinked polymers which are derived from aldehydes on the one hand and from phenols, ureas and melamines on the other hand, such as phenol-formaldehyde resins, urea-formaldehyde resins and melamine-formaldehyde resins.

19. Alkyd resins, such as glycerol/phthalic acid resins and their mixtures with melamine-formaldehyde resins.

20. Unsaturated polyester resins which are derived from copolyesters of saturated and unsaturated dicarboxylic acids with polyhydric alcohols and vinyl compounds as crosslinking agents, and also their halogen-containing modifications of low combustibility.

21. Crosslinked epoxide resins which are derived from polyepoxides, for example from bis-glycidyl ethers or from cycloaliphatic diepoxides.

22. Natural occurring polymers, such as cellulose and rubber, and also their polymer-homologously chemically modified derivatives, such as cellulose acetates, cellulose propionates and cellulose butyrates and the cellulose ethers, such as methylcellulose.

Of these polymers, groups 1 to 6, 13, 16 and 17 are to be singled out for special mention, as the stabilisers of the invention have an especially marked action in these substrates. In addition, polymers which are employed as surface-coating resins are of particular importance.

The stabilisers of the formula I are incorporated in the substrates in concentrations of 0.01 to 5% by weight, preferably of 0.1 to 1% by weight, based on the material to be stabilised.

The incorporation of the stabilisers can be effected by blending in at least one of the stabilisers of the invention and, if desired, further additives, by methods conventionally employed in the art, before or during shaping or also by applying the dissolved or dispersed compounds to the polymer, if desired with subsequent evaporation of the solvent.

The stabilised plastics material can also additionally contain other stabilisers or other additives customarily employed in plastics technology, for example those listed in German Offenlegungsschrift No. 2 349 962, pages 25–32.

Synergistic effects can be obtained when concurrently using known stabilisers. Such effects frequently occur when concurrently using other light stabilisers or organic phosphites.

The concurrent use of antioxidants is of particular importance in the stabilising of polyolefins.

The invention therefore also relates to the plastics stabilised by the addition of 0.01 to 5% by weight of a compound of the formula I and which, if desired, can contain yet further known and conventional additives. The plastics stabilised in this way can be employed in very diverse forms, for example in the form of films, filaments, ribbons or profiles or as binders for lacquers, adhesives or putty. The use of the stabilised plastics in thin layers, as in the form of filaments, sheets and lacquers, is of especial importance.

The manufacture and use of the compounds of the invention are described in more detail in the following Examples, in which parts and percentages are by weight.

EXAMPLE 1

68.2 g of 1,2,2,6,6-pentamethyl-4-aminopiperidine and 83.2 g of dimethyl itaconate (95% pure) are charged into a sulfonation flask fitted with a reflux condenser and stirred at 80° for 19 hours under nitrogen. The reflux condenser is then removed and replaced by a descending Liebig condenser. The internal temperature is slowly raised to 100° C. and the methanol eliminated is distilled off in a weak flow of nitrogen over the course of about 5 hours. Warm ligroin (boiling point 110°–140° C.) is then added to the hot reaction mixture and the mixture is filtered clear. On cooling, 1,2,2,6,6-pentamethyl-4-(4-methoxycarbonyl-2-pyrrolidon-1-yl)-piperidine crystallises out from the solution. The crystals are filtered off and recrystallised from ligroin (boiling point 110°–140° C.), affording colourless crystals with a melting point of 117°–118° C.

EXAMPLE 2

In accordance with Example 1, 2,2,6,6-tetramethyl-4-(4-methoxycarbonyl-2-pyrrolidon-1-yl)-piperidine is obtained from 2,2,6,6-tetramethyl-4-aminopiperidine and dimethyl itaconate. Melting point: 127°–128° C.

EXAMPLE 3

With stirring, a solution of 85.2 g of 1,2,2,6,6-pentamethyl-4-aminopiperidine in 80 ml of water is introduced at room temperature in the course of about 5 minutes into 61.5 g of itaconic acid. The temperature rises to about 75° C. during the addition. The mixture is then heated to reflux temperature and stirred at this temperature for a total of 60 hours. The reaction mixture, which has been cooled to room temperature, is then poured slowly at room temperature into 600 ml of acetone, with vigorous stirring in a turbine impeller mixer, whereupon 1,2,2,6,6-pentamethyl-4-(4-carboxy-2-pyrrolidon-1-yl)-piperidine immediately precipitates in the form of a fine crystalline powder. The compound is stirred for a further 30 minutes and is then collected by filtration and dried in vacuo at 80°. Melting point: 248°–250° C. (with decomposition; determination on a Kofler bench).

$C_{15}H_{26}N_2O_3$ calculated: C, 63.80%; H, 9.28%; N, 9.92%. Found: C, 63.6%; H, 9.2%; N, 10.1%.

A sample of the 1,2,2,6,6-pentamethyl-4-(4-carboxy-2-pyrrolidon-1-yl)-piperidine so obtained was reacted with diazomethane in diethyl ether, the "amino-acid" slowly going into solution as esterification takes place. The resultant 1,2,2,6,6-pentamethyl-4-(4-methoxycarbonyl-2-pyrrolidon-1-yl)-piperidine is identical to the compound obtained according to Example 1 in respect of all of its properties. Melting point: 116°–118° C.

EXAMPLE 4

In accordance with Example 3, 2,2,6,6-tetramethyl-4-(4-carboxy-2-pyrrolidon-1-yl)-piperidine is obtained from itaconic acid and 2,2,6,6-tetramethyl-4-aminopiperidine. Melting point: about 260° (with decomposition).

$C_4H_{24}N_2O_3$: calculated: C, 62.66%; H, 9.01%; N, 10.44%. Found: C, 62.9%; H, 9.0%; N, 10.7%.

EXAMPLE 5

12.1 g of allyl bromide are added dropwise at 75° in the course of about ¼ of an hour to a suspension of 22.6 g of 1,2,2,6,6-pentamethyl-4-(4-carboxy-2-pyrrolidon-1-yl)-piperidine and 15.2 g of anhydrous potassium carbonate in 80 ml of ethyl methyl ketone, with stirring (under $N_2$). The mixture is then stirred for a further 20 hours at reflux temperature.

For working up, the reaction mixture is filtered while still warm, the filtrate is washed with methylene chloride, the combined organic filtrates are completely freed from the solvent in a water jet vacuum, and the crude product is distilled in a bulb tube: boiling point 190°/0.01 mm Hg.

The distillate, which solidifies immediately as crystals when cold, is recrystallised from n-hexane, yielding 1,2,2,6,6-pentamethyl-4-(4-allyloxycarbonyl-2-pyrrolidon-1-yl)-piperidine with a melting point of 48°–49° C.

$C_{18}H_{30}N_2O_3$ calculated: C, 67.05%; H, 9.38%; N, 8.69%. Found: C, 66.9%; H, 9.3%; N, 8.8%.

EXAMPLE 6

0.1 g of lithium amide and 0.1 g of aluminium isopropoxide are added to a stirred solution, which has been heated to 125° C., of 29.6 g of 1,2,2,6,6-pentamethyl-4-(4-methoxycarbonyl-2-pyrrolidon-1-yl)-piperidine and 18.3 g of 1,4-bis-(2,2,6,6-tetramethyl-4-hydroxy-piperidin-1-yl)-2-butene in 300 ml of anhydrous xylene (mixture of isomers). The reaction mixture is then heated to about 138° C. in the course of 4 hours, while simultaneously passing a weak flow of nitrogen through the mixture, and, at the same time, the methanol liberated and xylene are slowly distilled off through a descending condenser. The internal temperature is raised slowly to about 160° C. and the bulk of the xylene is distilled off (time taken about 4 hours, total reaction time about 8 hours). After it has cooled, the reaction mixture is taken up in methylene chloride, washed twice with a small amount of 0.1 N acetic acid and twice with water, dried over sodium sulfate and filtered, and the filtrate is completely concentrated in a water jet vacuum. The initially resinous crude product is taken up in 50 ml of methylene chloride and the solution is poured, with stirring, into 500 ml of diethyl ether at room temperature. In the course of about 2 hours, the compound of the formula

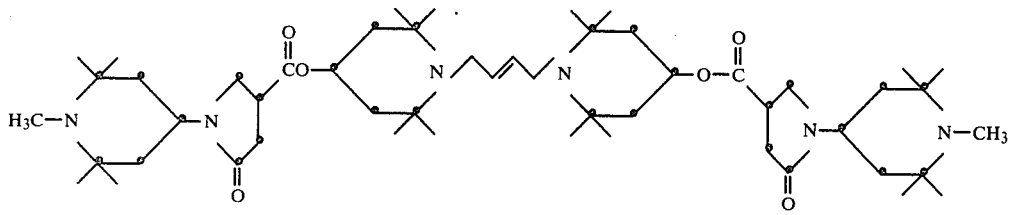

(mixture of diastereoisomers) crystallises out from the initially clear solution in the form of a virtually colourless crystalline powder, which is collected by filtration and dried. Melting point ~121°–123° C. (mixture of diastereoisomers).

A sample recrystallised from acetone melts at 123°–126°. The $^1$H-NMR spectrum accords well with the structure indicated above (mixture of diastereoisomers).

EXAMPLE 7

In accordance with Example 1, 92.2 g of 2-(2,2,6,6-tetramethylpiperidinyl)-ethylamine (boiling point 50°/0.005 mm Hg, $n_D^{20}$: 1.4749) and 83.2 g of dimethyl itaconate (about 95%) are stirred for 20 hours at 85°. The methanol eliminated is then distilled off in the course of about 4 hours and the temperature is raised to 100°.

For working up, the reaction mixture is first completely degassed under a high vacuum, freed from readily volatile constituents, and then subjected to molecular distillation. Boiling point: about 170°/0.01 mm Hg. The initially liquid distillate, viz. 2,2,6,6-tetramethyl-4-[2-(4-methoxycarbonyl-2-pyrrolidon-1-yl)-ethyl]-piperidine, solidifies as crystals after a short time and is recrystallised from n-pentane. Melting point: 50°–52° C.

EXAMPLE 8

In accordance with Example 6, the compound of the formula

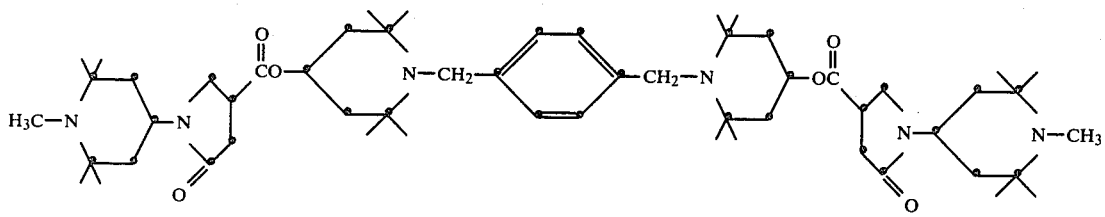

is obtained as an amorphous mixture of diastereoisomers by transesterification from 1,2,2,6,6-pentamethyl-4-(4-methoxycarbonyl-2-pyrrolidonyl-1)-piperidine and α,α-bis-(4-hydroxy-2,2,6,6-tetramethylpiperidyl-1)-p-xylene (m.p. 247°–249° C.). Softening point: about 75° C.

EXAMPLE 9

A solution of 59 g (0.2 mole) of 1,2,2,6,6-pentamethyl-4-(4-methoxycarbonyl-pyrrolidonyl-1)-piperidine, 34.3 g (0.2 mole) of 4-hydroxy-1,2,2,6,6-pentamethylpiperidine and 0.3 ml of tetrabutyl-orthotitanate is heated in 350 ml of xylene in a weak flow of nitrogen to about 135° C. in the course of 2 hours, while eliminated methanol and xylene are slowly distilled off through the descending cooler. The internal temperature is then slowly raised to about 155° C. in the course of 9 hours, during which time the xylene is almost completely distilled off. After cooling to about 50° C., the viscous residue is dissolved warm in 300 ml of n-hexane. The solution is stirred with 9 g of silica gel 60 (Merck; 0.063–0.200 mm), filtered, and the solvent is distilled off. The compound, which solidifies to crystals after a short time, is recrystallised from n-hexane, affording pure colourless 1,2,2,6,6-pentamethyl-4-[4-(1,2,2,6,6-pentamethylpiperidinyl-4-oxycarbonyl)-2-pyrrolidonyl-1]piperidine of the formula

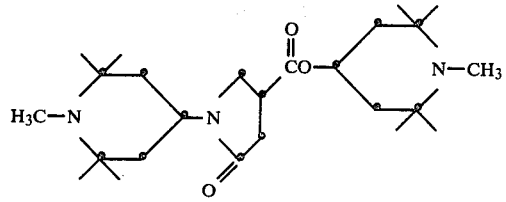

with a melting point of 89°–90° C.

$C_{25}H_{45}N_3O_3$ (435.6) calculated: C, 68.92; H, 10.41; N, 9.65%. Found: C, 69.2; H, 10.4; N, 9.7%.

EXAMPLE 10

In accordance with Example 9, the compound of the formula

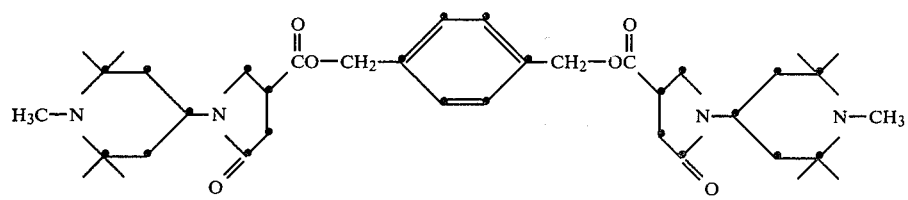

is obtained as a mixture of diastereoisomers from 1,2,2,6,6-pentamethyl-4-(4-methoxycarbonyl-2-pyrrolidonyl-1)-piperidine and 1,4-bis-hydroxymethylbenzene by transesterification. Melting point: 155°–160° C.

$C_{38}H_{58}N_4O_6$ (666.9) calculated: C, 68.44; H, 8.77; N, 8.40%. Found: C, 68.5; H, 8.9; N, 8.7%.

EXAMPLE 11

In accordance with Example 9, the compound of the formula

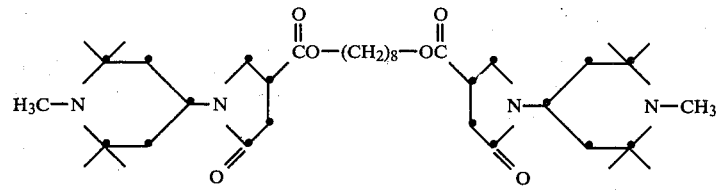

is obtained as a mixture of diastereoisomers from 1,2,2,6,6-pentamethyl-4-(4-methoxycarbonyl-2-pyrrolidonyl-1)-piperidine and 1,8-octanediol by transesterification. Melting point: 92°–98° C.

$C_{38}H_{66}N_4O_6$ (674.97) calculated: C, 67.62; H, 9.86; N, 8.30%. Found: C, 67.3; H, 10.0; N, 8.3%.

EXAMPLE 12

In accordance with Example 9, the compound of the formula

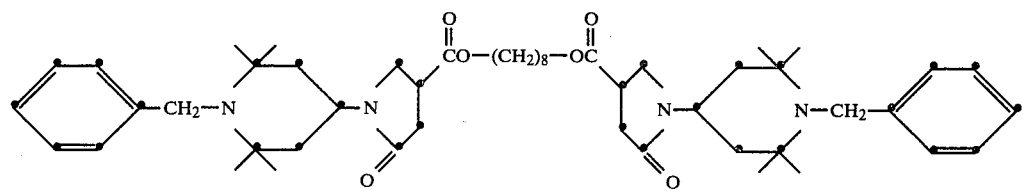

is obtained as a mixture of diastereoisomers from 1-benzyl-2,2,6,6-tetramethyl-4-(4-methoxycarbonyl-2-pyrrolidonyl-1)-piperidine (cf. Example 25) and 1,8-octanediol by transesterification and subsequent purification by column chromatography on silica gel 60 (0.063–0.200 mm; Merck) with diethyl ether/methanol (98:2) as eluant. Softening point about ~70° C.

$C_{50}H_{74}N_4O_6$ (827.12) calculated: C, 72.61; H, 9.02; N, 6.77%. Found: C, 72.8; H, 8.9; N, 7.0%.

EXAMPLE 13

With stirring, a melt consisting of 59.2 g (0.2 mole) of 1,2,2,6,6-pentamethyl-4-(4-methoxycarbonyl-2-pyrrolidonyl-1)-piperidine (obtained according to Example 1), 11.6 g (0.1 mole) of 1,6-diaminohexane and 50 mg of sodium methoxide, is heated in a weak flow of nitrogen for 18 hours to 140°–145° C., in the course of which the eliminated methanol is continuously distilled off from the reaction mixture.

For working up, the viscous melt is cooled to 60° C., dissolved in chloroform, filtered clear, and the filtrate is completely freed from solvent in vacuo. The crude compound is then further purified by column chromatography on silica gel 60 (0.063–0.200 mm; Merck) using diethyl ether/methanol/triethylamine in the volume ratio 70:25:5 as eluant. The compound of the structure

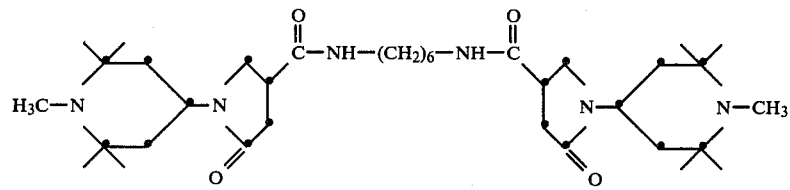

is isolated as an amorphous mixture of diastereoisomers. Softening point about 100° C. (determined on a Kofler bench).

$C_{36}H_{64}N_6O_4$ (644.9) calculated: C, 67.04; H, 10.00; N, 13.03%. Found: C, 67.2; H, 10.0; N, 12.8%.

The $^1$H-NMR spectrum (100 MHz) accords well with the above structure and confirms that the compound is a mixture of the diastereoisomers.

EXAMPLE 14

In accordance with Example 13, the compound of the formula

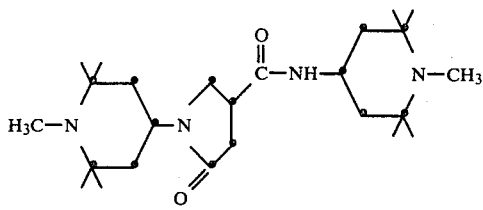

is obtained from 1,2,2,6,6-pentamethyl-4-(4-methoxycarbonyl-2-pyrrolidonyl-1)-piperidine (obtained in accordance with Example 1) and 4-amino-2,2,6,6-tetramethylpiperidine. Melting point: 159°–161° C. (recrystallisation from acetonitrile).

$C_{25}H_{46}N_4O_2$ (434.67) calculated: C, 69.08; H, 10.67; N, 12.89%. Found: C, 69.0; H, 10.7; N, 12.9%.

EXAMPLE 15

In accordance with Example 13, the compound of the formula

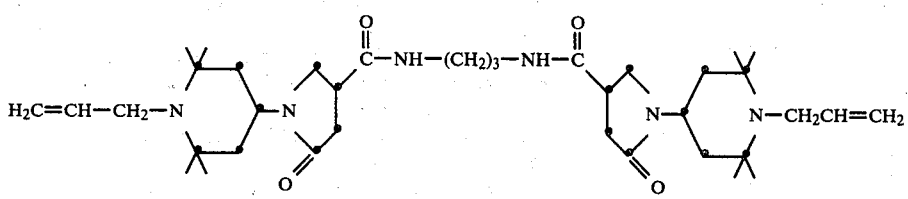

is obtained and isolated as a mixture of diastereoisomers from 1-allyl-2,2,6,6-tetramethyl-4-(4-methoxycarbonyl-2-pyrrolidonyl-1)-piperidine (obtained in accordance with Example 23) and 1,3-diaminopropane and subsequent purification by column chromatography (silica gel 60/0.63–0.200 mm; Merck) using diethyl ether/methanol (75:25) as eluant. Softening point: about 100° C. (determined on a Kofler bench). The $^{13}$C-NMR spectrum (90.52 MHz) accords well with the above structure (an approx. 1:1 mixture of diastereoisomers).

$C_{37}H_{62}N_6O_4$ (654.96) calculated: C, 67.85; H, 9.54; N, 12.83%. Found: C, 67.5; H, 9.4; N, 12.7%.

EXAMPLE 16

In accordance with Example 13, the compound of the formula

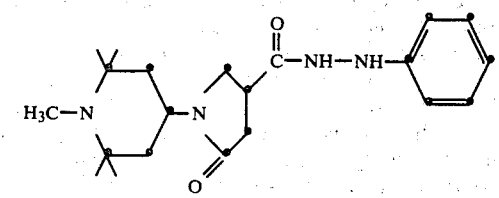

is obtained from 1,2,2,6,6-pentamethyl-4-(4-methoxycarbonyl-2-pyrrolidonyl-1)-piperidine and phenyl hydrazine. Melting point: 241°–243° C. (recrystallisation from isopropanol).

$C_{21}H_{32}N_4O_2$ (372.51) calculated: C, 67.71; H, 8.66; N, 15.04%. Found: C, 68.0; H, 8.8; N, 15.1%.

EXAMPLE 17

A solution of 35.5 g (0.12 mole) of 1,2,2,6,6-pentamethyl-4-(4-methoxycarbonyl-2-pyrrolidonyl-1)-piperidine and 4.1 g of pentaerythritol (0.03 mole), 100 mg of lithium amide and 200 mg of aluminium isopropoxide, is slowly heated in 350 ml of xylene (mixture of isomers) to about 135° C. in a weak flow of nitrogen, while the eliminated methanol and xylene are continuously distilled off through the descending cooler. The internal temperature is gradually raised to about 150° C. and kept for 24 hours, in the course of which the xylene is completely distilled off and almost quantitative transesterification is effected.

After cooling, the viscous residue is dissolved in hexane/dichloromethane (2:1) and the solution is stirred with 10 g of silica gel 60 (0.063–0.200 mm; Merck) for 30 minutes and filtered clear. The filtrate is washed repeatedly with 100 ml of cold water, dried over sodium sulfate, and the solvent is removed by distillation.

Pentaerythritol tetra-[1-(1,2,2,6,6-pentamethyl-4-piperidinyl)-2-pyrrolidone-4-carboxylate] of the formula

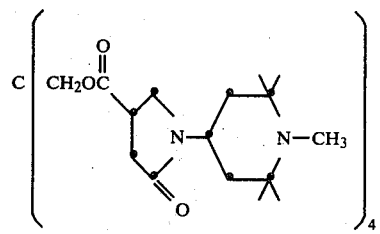

is dried in a high vacuum. The amorphous mixture of diastereoisomers has a softening point of about 95° C. (determined on a Kofler bench). The $^1$H-NMR spectrum (100 MHz) accords well with the above structure (mixture of isomers).

$C_{65}H_{108}N_8O_{12}$ (1193.55) calculated: C, 65.41; H, 9.12; N, 9.39%. Found: C, 65.6; H, 8.8; N, 9.4%.

EXAMPLE 18

In accordance with Example 18, the compound of the formula

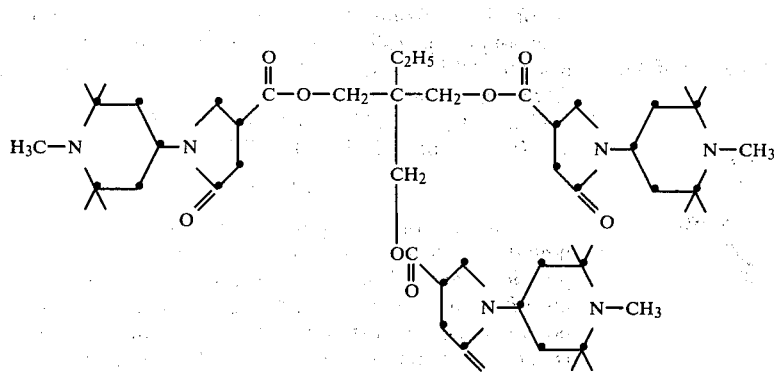

is obtained as a mixture of isomers from 1,2,2,6,6-pentamethyl-4-(4-methoxycarbonyl-2-pyrrolidonyl-1)-piperidine and 1,1,1-trishydroxymethylpropane. Softening point: about 70° C. (determined on a Kofler bench).

$C_{51}H_{86}N_6O_4$ (926.22) calculated: C, 66.06; H, 9.35; N, 9.06%. Found: C, 66.5; H, 9.5; N, 8.8%.

EXAMPLE 19

Oligomer of the recurring structural unit

A reaction mixture consisting of 21.8 g (0.08 mole) of 2,2,6,6-tetramethyl-4-(4-carboxy-2-pyrrolidonyl-1)-piperidine, 21.1 g (0.08 mole) of α,α-dibromo-p-xylene, 24.8 g (0.18 mole) of finely powdered potassium carbonate, 0.2 g of powdered potassium iodide and 70 ml of 2-butanone, is stirred vigorously for 48 hours at reflux temperature under a nitrogen atmosphere. The more viscous reaction mixture is then filtered warm and the filtrate is concentrated in vacuo.

The residue is dissolved in dichloromethane, filtered clear through a layer of hyflo and the polymer of the above structure is precipitated by slowly pouring the dichloromethane solution into 500 ml of acetonitrile with efficient stirring in a turbomixer. A polymer with a softening point of 190° C. (determined on a Kofler bench) and an average molecular weight ($M_n$) of 14,900 is obtained by reprecipitation and drying in a high vacuum.

The $^1$H-NMR spectrum accords well with the above structure.

$(C_{22}H_{30}N_2O_3)_n$ (370.5) calculated: N, 7.56%. Found: N, 7.2%.

EXAMPLE 20

The oligomer with the recurring structural unit

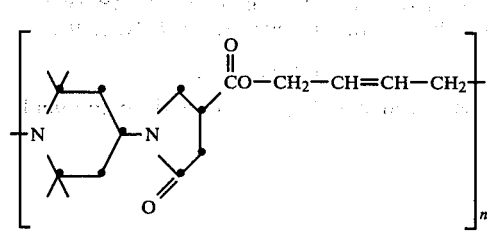

is obtained in accordance with Example 19 from 2,2,6,6-tetramethyl-4-(4-carboxy-2-pyrrolidonyl-1)-piperidine and 1,4-dichloro-2-butene. Precipitation in hexane furnishes an oligomer with a softening point of about 105° C. (determined on a Kofler bench) and an average molecular weight ($M_n$) of 1,400 (determined by vapour pressure osmometry).

$(C_{18}H_{28}N_2O_3)_n$ (320.4)$_n$ calculated: N, 8.75%. Found: N, 8.42%.

EXAMPLE 21

Nickel salt of 1,2,2,6,6-pentamethyl-4-(4-carboxy-2-pyrrolidonyl-1)-piperidine

A freshly prepared solution of 2.3 g (0.1 mole) of sodium in methanol is added dropwise, while excluding moisture, in the course of 1 hour at room temperature to a solution of 28.2 g (0.1 mole) of 1,2,2,6,6-pentamethyl-4-(4-carboxy-2-pyrrolidonyl-1)-piperidine in 80 ml of absolute methanol. Then a solution of 0.05 mole of nickel sulfamate in 150 ml of methanol is added dropwise and stirring is continued for 5 hours at room temperature. The nickel salt is isolated by filtering off the precipitated sodium sulfamate, completely removing the methanol from the filtrate in vacuo, dissolving the residue in dichloromethane, again filtering the solution clear, distilling off the solvent in vacuo, and drying the nickel salt in a high vacuum at 0.01 mbar and 80° C.

$(C_{15}H_{25}N_2O_3)_2Ni$ (621.4) calculated: Ni, 9.45; N, 9.02%. Found: Ni, 9.1; N, 8.9%.

EXAMPLE 22

A solution of 20 g of 2,2,6,6-tetramethyl-4-(4-methoxycarbonyl-2-pyrrolidonyl-1)-piperidine in 60 ml of acetic anhydride, to which 1 drop of conc. sulfuric acid is added, is stirred for 28 hours at 85° C. Excess acetic anhydride is then completely distilled off in vacuo, the residue is dissolved in a mixture of ether and dichloromethane (9:1), and this solution is washed with three 50 ml portions of 10% sodium bicarbonate solution and twice with water, and dried over sodium sulfate. The solvent is distilled off and 1-acetyl-2,2,6,6-tetramethyl-4-(4-methoxycarbonyl-2-pyrrolidonyl-1)-piperidine is recrystallised from acetonitrile/diethyl ether, affording the pure compound with a melting point of 112°–113° C.

$C_{17}H_{28}N_2O_4$ (324.4) calculated: C, 62.94; H, 8.70; N, 8.64%. Found: C, 63.0; H, 8.7; N, 8.5.

EXAMPLE 23

With stirring, a mixture of 42.3 g (0.15 mole) of 2,2,6,6-tetramethyl-4-(4-methoxycarbonyl-2-pyrrolidonyl-1)-piperidine, 27.6 g (0.2 mole) of finely powdered potassium carbonate and 24.2 g (0.2 mole) of allyl bromide in 100 ml of 2-butanone is heated in a nitrogen atmosphere for 24 hours to reflux temperature. For working up, the reaction mixture is filtered, the filtrate is freed from solvent in vacuo, and the residue is recrystallised twice from n-hexane, affording colourless 1-allyl-2,2,6,6-tetramethyl-4-(4-methoxycarbonyl-2-pyrrolidonyl-1)-piperidine with a melting point of 67°–69° C.

$C_{18}H_{30}N_2O_3$ (322.4) calculated: C, 67.05; H, 9.38; N, 8.69%. Found: C, 67.2; H, 9.3; N, 8.8%.

EXAMPLE 24

In accordance with Example 23, 2,2,6,6-tetramethyl-4-(4-benzyloxycarbonyl-2-pyrrolidonyl-1)-piperidine is obtained from 2,2,6,6-tetramethyl-4-(4-carboxy-2-pyrrolidonyl-1-)-piperidine with 1 mole of benzyl bromide, isolated in the form of the hydrobromide and recrystallised from acetonitrile. Melting point: 183°–185° C.

$C_{21}H_{31}N_2O_3Br$ (439.4) calculated: C, 57.41; H, 7.11; N, 6.38; Br, 18.19%. Found: C, 57.2; H, 7.0; N, 6.4; Br, 18.4%.

EXAMPLE 25

In accordance with Example 23, the compound of the formula

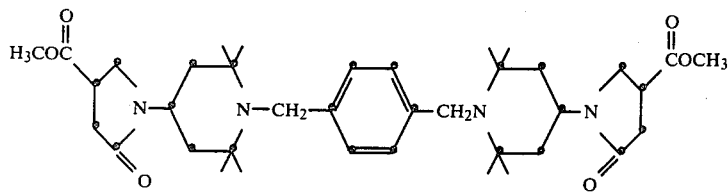

is obtained as a mixture of diastereoisomers from 2 moles of 2,2,6,6-tetramethyl-4-(4-methoxycarbonyl-2-pyrrolidonyl-1)-piperidine and 1 mole of α,α-dibromo-p-xylene, and subsequent purification by column chromatography on silica gel 60 (Merck), using diethyl ether/methanol (9:1) as eluant. Melting point: 210°–218° C. (recrystallisation from acetonitrile).

$C_{38}H_{58}N_4O_6$ (666.86) calculated: C, 68.44; H, 8.77; N, 8.40%. Found: C, 68.6; H, 8.6; N, 8.4%.

EXAMPLE 26

In accordance with Example 1 or 7, 1-benzyl-2,2,6,6-tetramethyl-4-(4-methoxycarbonyl-2-pyrrolidonyl-1)-piperidine is obtained from 1-benzyl-4-amino-2,2,6,6-tetramethylpiperidine (m.p. 73°–75° C.) and dimethyl itaconate. Melting point ~75° C.

$C_{22}H_{32}N_2O_3$ (372.5) calculated: C, 70.94; H, 8.66; N, 7.52%. Found: C, 7.14; H, 8.8; N, 7.7%.

EXAMPLE 27

With stirring, a solution of 6.9 g (0.04 mole) of hexamethyl diisocyanate in 10 ml of benzene is added dropwise in the course of 1 hour at 20°–25° C. to a solution of 22.6 g (0.08 mole) of 2,2,6,6-tetramethyl-4-(4-methoxycarbonyl-2-pyrrolidonyl-1)-piperidine in 60 ml of benzene and 30 ml of tetrahydrofurane. After stirring for 18 hours at room temperature, the precipitated bis-urea derivative (mixture of diastereoisomers) of the formula

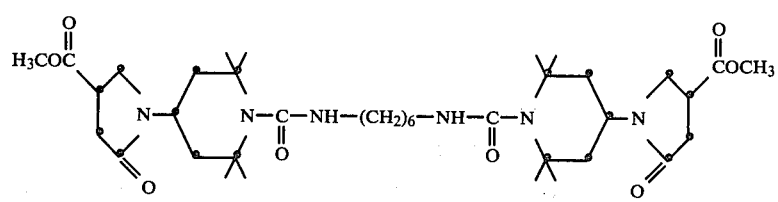

is collected by filtration and recrystallised from tetrahydrofurane. Melting point: 120°–123° C. (with decomposition).

EXAMPLE 28

Intermolecular polycondensate of 1-(2-hydroxyethyl-2,2,6,6-tetramethyl-4-(4-methoxycarbonyl-2-pyrrolidonyl-1)-piperidine:

(A) 1-(2-Hydroxyethyl)-2,2,6,6-tetramethyl-4-(4-methoxycarbonyl-2-pyrrolidonyl-1)-piperidine (monomer) An autoclave is charged with a solution of 56.5 g (0.2 mole) of 2,2,6,6-tetramethyl-4-(4-methoxycarbonyl-2-pyrrolidonyl-1)-piperidine in 170 ml of methanol, 0.8 ml of conc. hydrochloric acid and 17.6 g (0.4 mole) of ethylene oxide, and this reaction mixture is heated, with stirring, for 20 hours to 100°–105° C. under a nitrogen atmosphere. After it has cooled, the mixture is freed from excess ethylene oxide and from methanol, and the residue is further purified by column chromatography on silica gel 60 (0.63–0.200 mm. Merck) using diethyl ether/methanol (85:15) as eluant. Pure compound I is isolated.

C₁₇H₃₀N₂O₂ (326.4) calculated: C, 62.55; H, 9.27; N, 8.5%. Found: C, 62.1; H, 9.2; N, 8.3%.

(B) An uncontrolled intermolecular polycondensation is avoided by subjecting the hydroxy ester I immediately to polycondensation in the presence of tetrabutyl orthotitanate (as in Example 6) in xylene for 4 hours, yielding the polyester of the structure II (softening point about 160° C., determined on a Kofler bench) with an average molecular weight ($M_n$) of 8,100 (determined by vapour pressure osmometry).

(C₁₆H₂₆N₂O₃)ₙ (294.4)ₙ calculated: N, 9.52%. Found: N, 9.3%.

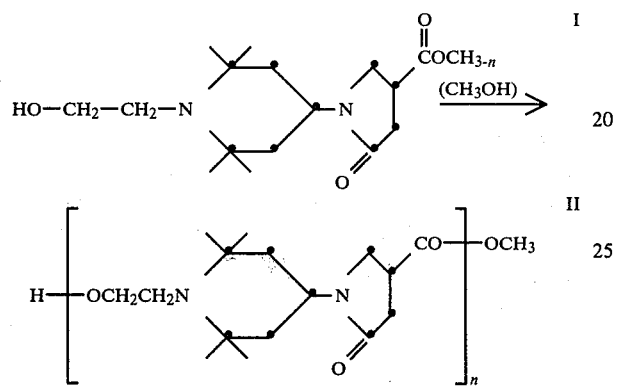

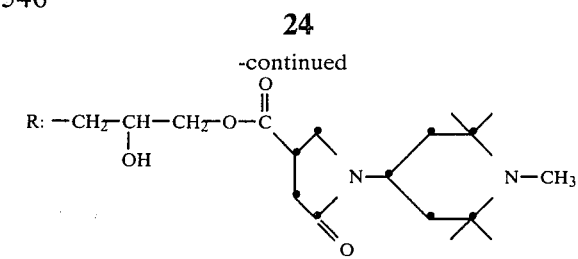

A melt consisting of 33.9 g (0.12 mole) of 1,2,2,6,6-pentamethyl-4-(4-carboxy-2-pyrrolidonyl-1)-piperidine, 12.3 g (0.04 mole) of triglycidyl isocyanurate (96.8%) and 0.2 g of dimethyl benzylamine, is heated in a nitrogen atmosphere for 20 hours to 145°–150° C. After it has cooled to 50° C., the reaction mixture is dissolved in dichloromethane. The solution is filtered and compound I is precipitated by pouring the solution into 500 ml of n-hexane with vigorous stirring in a turbomixer. The precipitate is isolated, dissolved in dichloromethane and then precipitated in n-hexane/diethyl ether (3:1). The resultant amorphous mixture of isomers has a softening point of about 135° C. (determined on a Kofler bench).

C₅₇H₉₃N₉O₁₅ (11.44.4) calculated: C, 59.82; H, 8.19; N, 11.02%. Found: C, 59.6; H, 8.3; N, 10.6%.

EXAMPLE 30

In accordance with Example 28, the compound of the formula

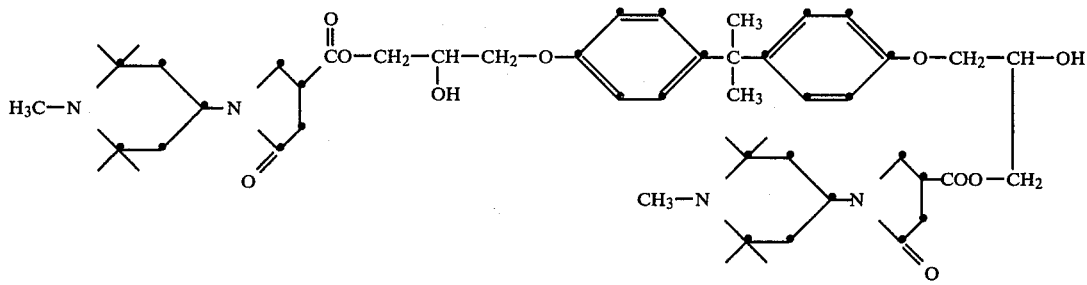

is obtained as an amorphous mixture of isomers (softening point) from 2 moles of 1,2,2,6,6-pentamethyl-4-(4-carboxy-2-pyrrolidonyl-1)-piperidine and 1 mole of bisphenol A diglycidyl ether by heating in 1-methyl-2-pyrrolidone as solvent. The ¹H-NMR spectrum (100 MHz) accords well with the above structure (mixture of isomers).

EXAMPLE 29

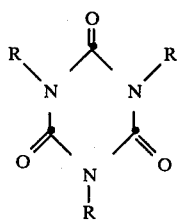

EXAMPLE 31

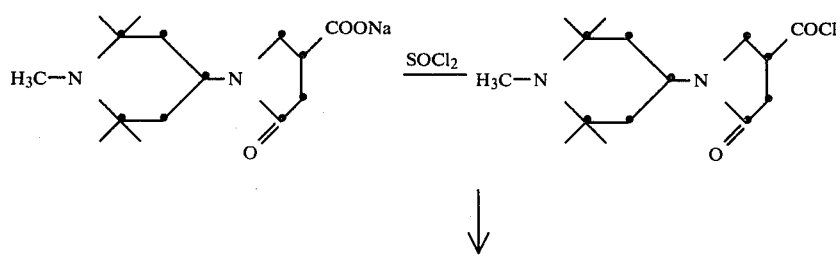

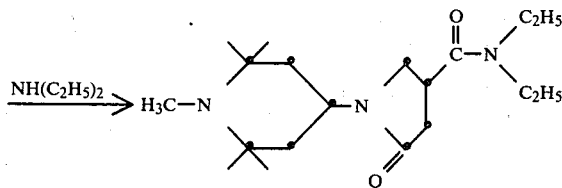

9.52 g of thionyl chloride in 25 ml of toluene are added dropwise at about 0° C. in the course of 40 minutes to a suspension of 24.1 g of finely powdered dry sodium salt of 1,2,2,6,6-pentamethyl-4-(4-carboxy-2-pyrrolidonyl-1)-piperidine in 75 ml of toluene and 0.5 ml of dimethyl formamide. The mixture is then stirred for 2 hours at room temperature. Then 17.6 ml of diethylamine in 25 ml of toluene are added dropwise at 0° C. and in the course of 1½ hours to the 1,2,2,6,6-pentamethyl-4-(4-chlorocarbonyl-2-pyrrolidonyl-1)-piperidine which has formed, and the batch is subsequently stirred for 14 hours at room temperature. For working up, the reaction mixture is filtered and the toluene solution is washed five times with water, dried over sodium sulfate, clarified with Tonsil AG, and the solvent is distilled off in vacuo. The crude product is recrystallized repeatedly from hexane, affording 1,2,2,6,6-pentamethyl-4-(4-diethylaminocarbonyl-2-pyrrolidonyl-1)-piperidine with a melting point of 98°–99° C.

$C_{19}H_{35}N_3O_2$ (337.51) calculated: C, 67.62; H, 10.45; N, 12.45%. Found: C, 67.3; H, 10.4; N, 12.3%.

What is claimed is:

1. A pyrrolidone of the formula I

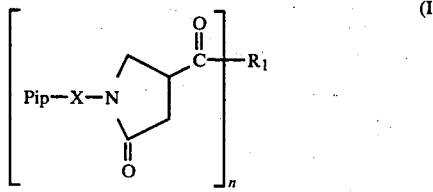

wherein n is 1, 2, 3 or 4; $R_1$ is hydroxyl, hydroxyl converted to Ca, Mg, Al, Zn, Co or Ni salts, or, when n is 1, is $C_{1-20}$ alkoxy, $C_{3-20}$ oxaalkoxy, $C_{3-20}$ alkenyloxy, $C_{3-6}$ alkynyloxy, $C_{5-7}$ cycloalkoxy, $C_{6-18}$ aryloxy, ($C_{1-8}$ alkyl)-phenoxy, halogenophenoxy, hydroxyphenoxy, ($C_{1-8}$ alkyl)-hydroxyphenoxy, $C_{7-16}$ aralkoxy which can be substituted in the phenyl nucleus by $C_{1-8}$ alkyl, halogen or hydroxyl, or also 2-hydroxyethoxy, which can be substituted in the 2-position by alkyl, phenyl or phenoxymethyl, or also amino, $C_{1-20}$ alkylamino, $C_{3-4}$ alkenylamino, di-$C_{1-20}$-alkylamino, di-$C_{3-14}$-alkenylamino, $C_{5-7}$ cycloalkylamino, di-$C_{5-7}$-cycloalkylamino, $C_{6-18}$ arylamino, ($C_{1-8}$ alkylphenyl)-amino, (halophenyl)amino, (hydroxyphenyl)amino or ($C_{1-8}$ alkylhydroxyphenyl)amino, while the amino group can also be N-substituted by $C_{1-8}$ alkyl, or a radical of the formula IVa

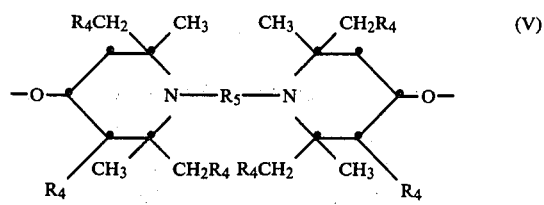

in which $R_4$ is hydrogen or methyl, $R_{16}$ is hydrogen, $C_{1-16}$ alkyl, $C_{3-8}$ alkenyl, propargyl, $C_{7-16}$ aralkyl, $C_{1-4}$ alkanoyl, $C_{3-5}$ alkenoyl, $C_{3-6}$ β-hydroxyalkyl, $C_{8-12}$ β-hydroxyaralkyl, ($C_{1-4}$ alkoxycarbonyl) methyl, oxyl or 2-hydroxy-3-phenoxypropyl, and Z is O, NH or N($C_{1-12}$alkyl);

when n is 2, $R_1$ is —O—$R_3$—O—, in which $R_3$ is $C_{2-20}$ alkylene, $C_{4-8}$ alkenylene, $C_4$ alkynylene, $C_{5-6}$ cycloalkylene, $C_{6-10}$ arylene or $C_{7-16}$ aralkylene, or also

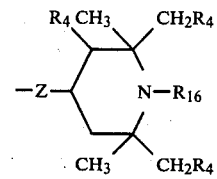

in which $R_4$ is hydrogen or methyl and $R_5$ is 2-butenylene, p-phenylenedimethylene, or —N($R_6$)—$R_7$—N($R_6$)—, in which $R_6$ is hydrogen, $C_{1-6}$ alkyl, $C_{3-5}$ alkenyl, $C_{5-6}$ cycloalkyl, phenyl, $C_{7-12}$ aralkyl or 2,2,6,6-tetramethylpiperidin-4-yl with hydrogen, methyl or benzyl substituted at the piperidine nitrogen atom and $R_7$ is $C_{2-12}$ alkylene, $C_{3-12}$ oxalkylene, $C_{3-12}$ azalkylene, $C_{6-12}$ arylene, $C_{8-15}$ aralkylene or $C_{5-6}$ cycloalkylene, or also —O—$CH_2$—C(OH)($R_8$)—$R_9$—C(OH)($R_8$)—$CH_2$—O—, in which $R_8$ is hydrogen or methyl, or in which the radicals $R_8$ together with the radical to which they are linked can form a 5- or 6-membered cycloalkyl ring, and in which $R_9$ is a direct bond, $C_{1-6}$ alkylene or $C_{3-6}$ oxalkylene or in which $R_9$ is VI or VII

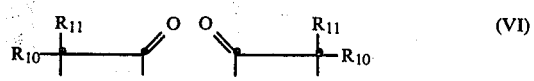

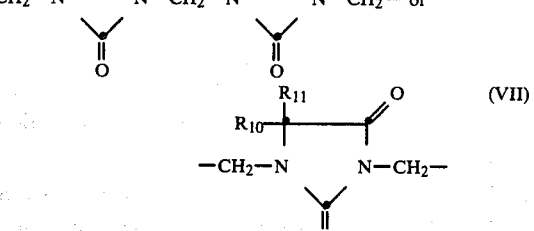

and $R_{10}$ and $R_{11}$ are hydrogen or $C_{1-4}$ alkyl, or $R_{10}$ and $R_{11}$ together are tetramethylene or pentamethylene;

when n is 3, $R_1$ is a trioxy radical of a $C_{3-20}$ alkanetriol in which one carbon atom is attached to not more than one oxygen atom, or also a radical VIII

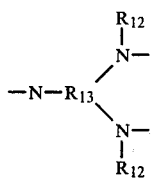
(VIII)

in which $R_{12}$ is hydrogen, $C_{1-4}$ alkyl, $C_{3-5}$ alkenyl, phenyl or benzyl, and in which $R_{13}$ is a trivalent radical of $C_{3-20}$ alkyl, $C_{6-12}$ aryl or $C_{7-16}$ aralkyl, or also a radical IX

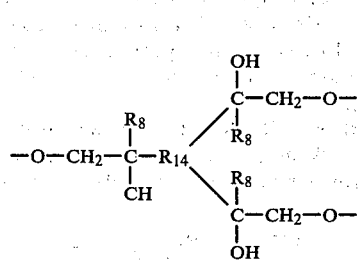
(IX)

in which $R_8$ is hydrogen or methyl or two radicals $R_8$ together with the radical to which they are linked form a 5- or 6-membered cycloalkyl ring, and in which $R_{14}$ is a trivalent radical of $C_{3-18}$ alkyl, or $R_{14}$ is X

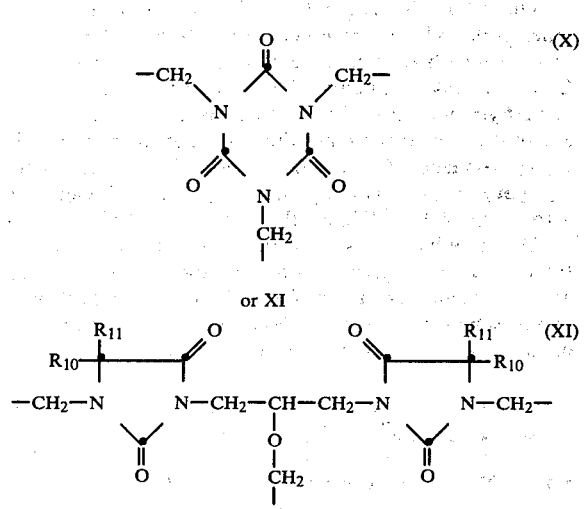
(X)

or XI (XI)

in which $R_{10}$ and $R_{11}$ are hydrogen or $C_{1-4}$ alkyl, or $R_{10}$ and $R_{11}$ together are tetramethylene or pentamethylene; and when n is 4, $R_1$ is a tetroxy radical of a $C_{4-20}$ alkanetetraol in which one carbon atom is attached to not more than one oxygen atom, or also a radical XII

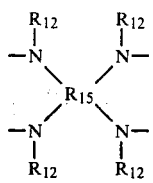
(XII)

in which $R_{12}$ is hydrogen, $C_{1-4}$ alkyl, $C_{3-5}$ alkenyl, phenyl or benzyl and $R_{15}$ is a tetravalent radical of $C_{3-20}$ alkyl, $C_{6-12}$ aryl or $C_{7-16}$ aralkyl;

X-Pip is a radical of the formulae XIII-XX

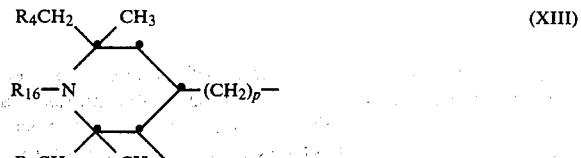
(XIII)

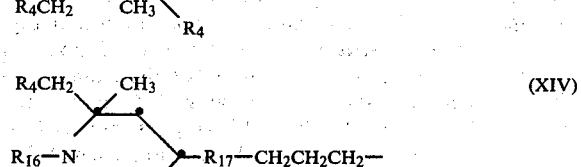
(XIV)

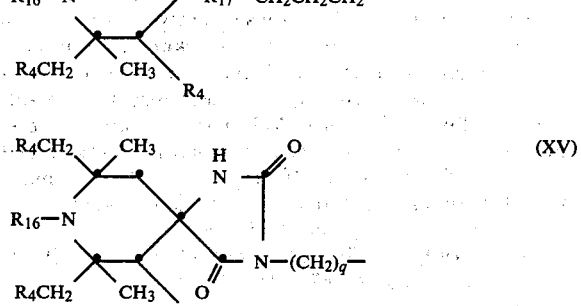
(XV)

(XVI)

(XVII)

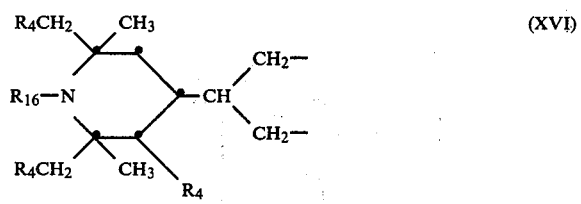
(XVIII)

-continued

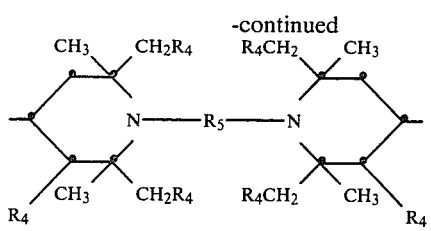

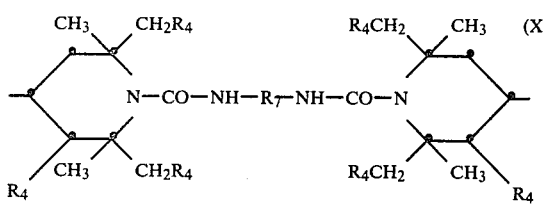

in which $R_4$, $R_5$, $R_7$ and $R_{16}$ are as previously defined, $R_{17}$ is oxygen or $NR_{18}$ with $R_{18}$ being hydrogen, methyl, benzyl, allyl or $C_{2-5}$ alkanoyl, p is 0 or 2 and q is 2, 3, 4 or 5;

or the oligomers or polymers of said pyrrolidones corresponding to the formulae III or IV

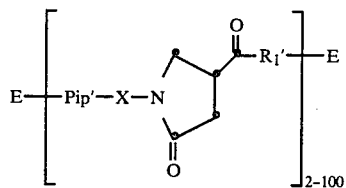

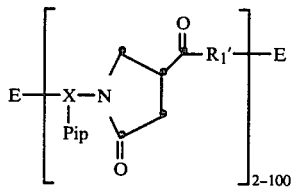

wherein X—Pip is as defined above, X—Pip' corresponds to X—Pip, $R_1'$ corresponds to the radical $R_1$ and E is hydrogen or $C_{1-6}$ alkoxy.

2. A pyrrolidone according to claim 1 of the formula II

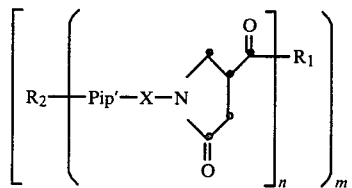

wherein n and $R_1$ are as defined in claim 1, m is 1 or 2, and when m is 1, $R_2$—Pip'—X— is a radical of the formulae XIII, XIV or XV as defined in claim 1, and when m is 2, $R_2$—Pip'—X— is a radical of the formula XVI-XX as defined in claim 1.

3. A pyrrolidone according to claim 2, wherein n is 1 or 2 and, if n is 1, $R_1$ is hydroxyl, hydroxyl which has been converted to a Ca, Mg, Al, Zn, CO or Ni salt, $C_{1-12}$ alkoxy, amino, $C_{1-12}$ alkylamino or di-$C_{1-12}$ alkylamino, or, if n is 2, $R_1$ is $C_{2-8}$ alkylenedioxy or $C_{2-8}$ alkylenediamino, m is 1 and $R_2$—Pip'—X— is a radical XIII

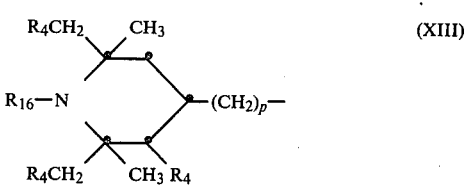

in which p is 0, $R_4$ is hydrogen and $R_{16}$ is hydrogen, $C_{1-8}$ alkyl, benzyl, $C_{1-4}$ alkanoyl or $C_{2-6}$ β-hydroxyalkyl.

4. A pyrrolidone according to claim 3, wherein n is 1, $R_1$ is hydroxyl, hydroxyl which has been converted to a Ca, Mg, Al, Zn, CO or Ni salt, $C_{1-6}$ alkoxy, amino, $C_{1-6}$ alkylamino or di-$C_{1-6}$-alkylamino, m is 1 and $R_2$—Pip'—X— is a radical XIII in which p is 0, $R_4$ is hydrogen and $R_{16}$ is hydrogen, methyl or benzyl.

5. A pyrrolidone according to claim 1 of the formula III, wherein $R_1'$ is oxygen and —Pip'—X— is a radical XXI

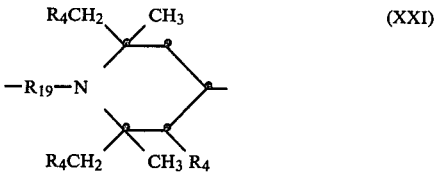

in which $R_4$ is hydrogen and $R_{19}$ is ethylene, 2-methylethylene, 2-ethylethylene, 2-phenylethylene, 2-butenylene or p-phenylenedimethylene, and E is hydrogen or $C_{1-6}$ alkoxy.

6. A pyrrolidone according to claim 1 of the formula IV, wherein $R_1'$ is oxygen and —X—(Pip)— is 1,3-propylene which in the 2-position carries a radical XIII in which p is 0, $R_4$ is hydrogen and $R_{16}$ is hydrogen, methyl or benzyl, and E is hydrogen or $C_{1-6}$ alkoxy.

7. 1,2,2,6,6-Pentamethyl-4-(4-methoxycarbonyl-2-pyrrolidon-1-yl)-piperidine according to claim 1.

8. 2,2,6,6-Tetramethyl-4-(4-methoxycarbonyl-2-pyrrolidonyl-1)-piperidine according to claim 1.

9. Pentaerythritol tetra-[1-(1,2,2,6,6-pentamethyl-4-piperidinyl)-2-pyrrolidone-4-carboxylate] according to claim 1.

* * * * *